(12) United States Patent
Jia et al.

(10) Patent No.: US 9,807,691 B2
(45) Date of Patent: Oct. 31, 2017

(54) POLLING BEACON

(71) Applicant: QUALCOMM Incorporated, San Diego, CA (US)

(72) Inventors: Zhanfeng Jia, Belmont, CA (US); Sandip HomChaudhuri, San Jose, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/781,612

(22) Filed: Feb. 28, 2013

(65) Prior Publication Data

US 2014/0241226 A1   Aug. 28, 2014

(51) Int. Cl.
*H04W 52/02*   (2009.01)
*H04W 48/14*   (2009.01)
*H04W 48/12*   (2009.01)

(52) U.S. Cl.
CPC ....... *H04W 52/0229* (2013.01); *H04W 48/14* (2013.01); *H04W 52/0216* (2013.01); *H04W 48/12* (2013.01); *Y02B 60/50* (2013.01)

(58) Field of Classification Search
None
See application file for complete search history.

(56) References Cited

U.S. PATENT DOCUMENTS

| | | |
|---|---|---|
| 6,006,106 A | 12/1999 | Cook et al. |
| 6,131,049 A | 10/2000 | Marsan et al. |
| 7,500,119 B2 * | 3/2009 | Tsai, Jr. ............... 713/300 |
| 7,586,948 B2 | 9/2009 | Hiddink et al. |
| 7,653,031 B2 | 1/2010 | Godfrey |

(Continued)

FOREIGN PATENT DOCUMENTS

| | | |
|---|---|---|
| CN | 101056440 A | 10/2007 |
| CN | 102036340 A | 4/2011 |

(Continued)

OTHER PUBLICATIONS

ISA/EPO, International Search Report and Written Opinion of the International Searching Authority, Int'l App. No. PCT/US2014/014288, Jul. 23, 2014, European Patent Office, Rijswijk, NL, 11 pgs.

(Continued)

*Primary Examiner* — Rina Pancholi
(74) *Attorney, Agent, or Firm* — Holland and Hart LLP (57) ABSTRACT

Beacon-poll frames are transmitted from a station (STA) to a wireless AP in an opportunistic manner. In response to receiving a beacon-poll frame, the wireless AP transmits a unicast beacon frame to the STA, thereby eliminating the need for the STA to periodically wake up to receive broadcast beacon frames from the AP. The wireless AP may transmit the unicast beacon frame at a higher speed than a conventional broadcast beacon frame. As a result, the time that the STA must be awake to receive the unicast beacon frame is significantly less than the time that the STA must be awake to receive a conventional broadcast beacon frame, thereby resulting in significant power savings within the STA. The wireless AP may aggregate downlink (DL) data packets to be transmitted to the STA with the unicast beacon frame, resulting in further power savings within the STA.

38 Claims, 5 Drawing Sheets

(56) References Cited

U.S. PATENT DOCUMENTS

| | | | |
|---|---|---|---|
| 8,027,378 B1 | 9/2011 | Yang et al. | |
| 8,099,094 B2 | 1/2012 | Marinier et al. | |
| 8,165,050 B2 | 4/2012 | Ngo et al. | |
| 8,279,896 B2 | 10/2012 | Etkin et al. | |
| 8,284,061 B1* | 10/2012 | Dione | 340/572.1 |
| 8,301,760 B1 | 10/2012 | Zadicario et al. | |
| 2003/0179731 A1* | 9/2003 | Noguchi | H04L 12/5695 370/331 |
| 2004/0146091 A1 | 7/2004 | Chang et al. | |
| 2004/0190648 A1 | 9/2004 | Anim-Appiah et al. | |
| 2004/0203817 A1 | 10/2004 | Rao et al. | |
| 2004/0218568 A1 | 11/2004 | Goodall et al. | |
| 2005/0176432 A1 | 8/2005 | Kamura et al. | |
| 2006/0009220 A1 | 1/2006 | Kiyomoto et al. | |
| 2007/0008922 A1 | 1/2007 | Abhishek et al. | |
| 2007/0047499 A1 | 3/2007 | Montojo et al. | |
| 2007/0116007 A1 | 5/2007 | Xiao et al. | |
| 2007/0140188 A1 | 6/2007 | Meikote et al. | |
| 2007/0147321 A1 | 6/2007 | Jung | |
| 2007/0165589 A1* | 7/2007 | Sakoda | 370/345 |
| 2007/0249354 A1 | 10/2007 | Seo et al. | |
| 2007/0258419 A1 | 11/2007 | Zhao et al. | |
| 2008/0101324 A1* | 5/2008 | Stark | 370/345 |
| 2008/0170551 A1 | 7/2008 | Zaks | |
| 2008/0232373 A1* | 9/2008 | Iyer et al. | 370/392 |
| 2009/0034460 A1 | 2/2009 | Moratt et al. | |
| 2009/0067397 A1* | 3/2009 | Seok | 370/338 |
| 2009/0129275 A1 | 5/2009 | Watanabe et al. | |
| 2009/0238133 A1 | 9/2009 | Sakoda | |
| 2009/0296864 A1 | 12/2009 | Lindoff et al. | |
| 2010/0029325 A1 | 2/2010 | Wang et al. | |
| 2010/0177757 A1 | 7/2010 | Kim et al. | |
| 2010/0195569 A1* | 8/2010 | Matsushita | H04B 3/54 370/328 |
| 2010/0219250 A1 | 9/2010 | Wang et al. | |
| 2010/0223524 A1 | 9/2010 | Duggan et al. | |
| 2010/0223534 A1 | 9/2010 | Earnshaw et al. | |
| 2010/0278065 A1 | 11/2010 | Sun et al. | |
| 2011/0002234 A1 | 1/2011 | Chang et al. | |
| 2011/0070836 A1 | 3/2011 | Park et al. | |
| 2011/0075635 A1 | 3/2011 | Ryu et al. | |
| 2011/0083065 A1 | 4/2011 | Singh et al. | |
| 2011/0255618 A1 | 10/2011 | Zhu et al. | |
| 2011/0305288 A1 | 12/2011 | Liu et al. | |
| 2012/0082049 A1 | 4/2012 | Chen et al. | |
| 2012/0094681 A1 | 4/2012 | Freda et al. | |
| 2012/0129560 A1 | 5/2012 | Lunden et al. | |
| 2012/0164948 A1 | 6/2012 | Narasimha et al. | |
| 2012/0188998 A1* | 7/2012 | Philips et al. | 370/350 |
| 2012/0314636 A1 | 12/2012 | Liu | |
| 2012/0321012 A1 | 12/2012 | Elenes et al. | |
| 2013/0094536 A1* | 4/2013 | Hui et al. | 375/133 |
| 2013/0194955 A1 | 8/2013 | Chang et al. | |
| 2013/0201838 A1 | 8/2013 | Homchaudhuri et al. | |
| 2013/0230035 A1* | 9/2013 | Grandhi et al. | 370/338 |
| 2013/0315141 A1 | 11/2013 | Homchaudhuri et al. | |
| 2014/0133469 A1 | 5/2014 | Lee et al. | |
| 2014/0177501 A1* | 6/2014 | Seok et al. | 370/311 |
| 2015/0071084 A1 | 3/2015 | Homchaudhuri et al. | |

FOREIGN PATENT DOCUMENTS

| | | |
|---|---|---|
| EP | 1424862 A1 | 6/2004 |
| EP | 1971164 A1 | 9/2008 |
| EP | 2106192 A2 | 9/2009 |
| EP | 2372949 A1 | 10/2011 |
| KR | 20060014900 A | 2/2006 |
| KR | 100813884 B1 | 3/2008 |
| WO | 94/27377 A1 | 11/1994 |
| WO | WO-2008027907 A2 | 3/2008 |
| WO | WO-2008147130 A2 | 12/2008 |
| WO | 2009062185 A2 | 5/2009 |
| WO | WO-2013008989 A1 | 1/2013 |

OTHER PUBLICATIONS

Thakur, S.S., et al., "Clock Synchronization in IEEE 802.11 Ad Hoc Networks," Intelligent Information Technology, 7th International Conference on Information Technology, CIT 2004, Dec. 2004, pp. 180-189, vol. 3356, Springer-Verlag Berlin, Heidelberg, Germany.

* cited by examiner

FIG. 6

POLLING BEACON

FIELD OF THE INVENTION

The present invention relates to the use of a polling beacon to save power in a wireless communication system.

RELATED ART

In a Wi-Fi system, a Wi-Fi device might be simultaneously connected to a first BSS (basic service set) network as a station (STA) (or a Wi-Fi direct client) in a first channel, and also participate in a second BSS network as a station (STA) (or Wi-Fi direct client) in a second channel, different than the first channel. In order to participate in both the first and second BSS networks, the Wi-Fi device must be able to receive beacon frames that are periodically transmitted from wireless access points (APs) (or Wi-Fi direct group owners (GOs)) in both the first and second BSS networks. Thus, within the first BSS network, the Wi-Fi device will periodically wake up at a first set of predetermined target beacon transmission times (TBTTs) to receive beacon frames (i.e., beacons) broadcast from a first associated wireless AP (or Wi-Fi direct GO) on the first channel. Similarly, the Wi-Fi device periodically wakes up at a second set of predetermined TBTTs to receive beacon frames broadcast from a second associated wireless AP (or Wi-Fi direct GO) on the second channel. The interval between the TBTTs in the first BSS network and the TBTTs in the second BSS network are randomly placed. As a result, it is possible that the TBTTs in the first BSS network may overlap (or be very close to) the TBTTs in the second BSS network. In this case, the Wi-Fi device may wake up to receive a beacon frame transmitted on the first channel in the first BSS network, and at the same time, miss a beacon frame transmitted on the second channel in the second BSS network. If enough beacon frames are missed on the second channel, the Wi-Fi device will not be able to remain associated with the second wireless AP in the second BSS network.

It would therefore be desirable to have a method and structure that allows a Wi-Fi device to be simultaneously connected to two different wireless APs, which are associated with two different BSS networks on two different channels, without missing beacons from either of the two wireless APs.

SUMMARY

Accordingly, the present invention provides a beacon-polling process that allows a station (STA) to receive beacon information from a wireless AP in an opportunistic manner, rather than requiring the STA to periodically wake up to receive the beacon frames broadcast by the wireless AP at the predetermined TBTTs.

In accordance with one embodiment, the beacon-polling process is enabled between the STA and the wireless AP using a handshake process that occurs during the association of the STA with the wireless AP. This handshake process may establish various features to be enabled/implemented within the beacon-polling process.

Once the beacon-polling process is enabled between the STA and the wireless AP, the STA will transmit beacon-poll frames to the wireless AP in an opportunistic manner. More specifically, the STA will transmit beacon-poll frames to the wireless AP at times when the STA is in an active state in the associated network. In response to receiving a beacon-poll frame from the STA, the wireless AP transmits a unicast beacon frame to the STA, wherein the unicast beacon frame includes the beacon information the STA would otherwise receive from a conventional beacon frame broadcast by the wireless AP at a TBTT. Because the STA receives the beacon information required to remain associated with the wireless AP from the unicast beacon frame, the STA does not need to wake up at the TBTT to receive the beacon frame broadcast by the wireless AP. As a result, the possibility of missing a beacon frame broadcast by the wireless AP at the TBTT is eliminated.

In one embodiment, the wireless AP transmits the unicast beacon frames at a data rate that is higher than the data rate at which the wireless AP transmits broadcast beacon frames, thereby minimizing overhead associated with the unicast beacon frames and minimizing power consumption within the STA. In another embodiment, the wireless AP further minimizes overhead by including downlink data for the STA in the unicast beacon frame. The wireless AP can further minimize overhead by reducing or compressing the beacon information included in the unicast beacon frame. The wireless AP can further minimize overhead by limiting the number of unicast beacon frames transmitted to the STA during a beacon interval (or during multiple beacon intervals).

In another embodiment, the wireless AP monitors the busy airtime of the channel used to communicate with the STA, and if this busy airtime exceeds a predetermined percentage of the total airtime, then the wireless AP will deactivate the beacon-polling process. The wireless AP may also monitor the number of stations (STAs) capable of participating in the beacon-polling process, and if this number of STAs exceeds a predetermined number, then the wireless AP will deactivate the beacon-polling process. The deactivation of the beacon-polling process can be delayed by one or more beacon intervals, thereby ensuring that all STAs are properly informed of the deactivation of the beacon-polling process. The wireless AP may also re-activate the beacon-polling process if the busy airtime subsequently decreases below the predetermined percentage and/or the number of STAs capable of participating in the beacon polling-process becomes less than the predetermined number.

The present invention will be more fully understood in view of the following description and drawings.

DETAILED DESCRIPTION

Figure 1:
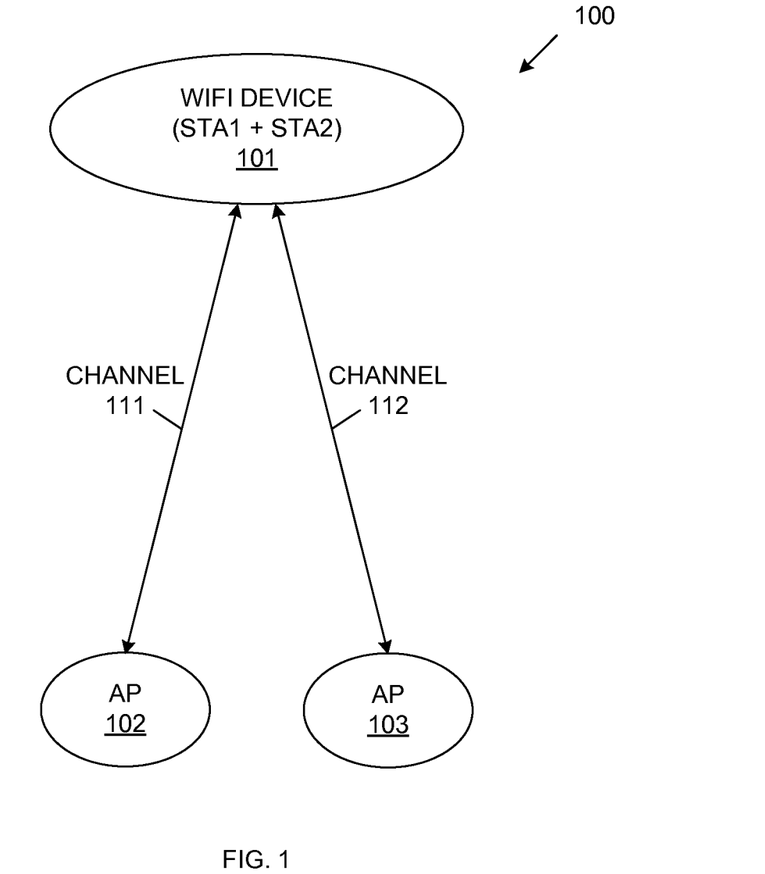
FIG. 1 is a block diagram of a conventional Wi-Fi system, which includes a Wi-Fi device and two wireless access points.

FIG. 1 is a block diagram of a Wi-Fi system 100, which includes Wi-Fi device 101 and wireless access points (APs)

102 and 103. Wi-Fi device 101 is connected to a first BSS network that includes wireless AP 102, and also participates in a second BSS network that includes wireless AP 103. More specifically, Wi-Fi device 101 operates as a station (STA1) connected to wireless AP 102 in a first channel 111, and also operates as a station (STA2) in a separate second channel 112.

Wi-Fi device 101 typically operates in a 'Wi-Fi Power Save Mode' in order to minimize power consumption, wherein the Wi-Fi device 101 alternately operates in a low-power sleep state and a high-power active state. Within the first BSS network, Wi-Fi device 101 periodically wakes up (transitions from the sleep mode to the active state) at predetermined target beacon transmission times (TBTTs) to receive beacon frames (i.e., beacons) broadcast from the associated wireless AP 102 on the first channel 111. The wireless AP 102 does not transmit frames to Wi-Fi device 101 while the associated station STA1 is in the sleep mode on the first channel 111. While the associated station STA1 is in the sleep mode, the wireless AP 102 buffers frames to be transmitted to the station STA1 on the first channel 111, and indicates the presence of these buffered frames using a TIM (traffic indication map) information element included in a beacon, which is broadcast from the wireless AP 102 to the station STA1 at a TBTT on the first channel 111. Therefore, it is important for the station STA1 to receive the beacons from the wireless AP 102, such that there is no significant delay in receiving the frames buffered at the wireless AP 102.

Similarly, within the second BSS network, Wi-Fi device 101 periodically wakes up at predetermined target beacon transmission times (TBTTs) to receive beacons transmitted from the associated wireless AP 103 on the second channel 112. The wireless AP 103 operates in a similar manner as wireless AP 102, periodically transmitting beacons to the associated station STA2 on the second channel 112 at predetermined TBTTs. Again, it is important for the station STA2 to receive the beacons from the wireless AP 103, such that there is no significant delay in receiving the frames buffered at the wireless AP 103.

The wireless APs 102 and 103 will each transmit its respective beacons based on its timing synchronization function (TSF) counter and its beacon interval setting, so the intervals between the beacons of wireless AP 102 and wireless AP 103 are randomly placed. If the beacon interval is the same (or similar) in both networks, there is a possibility that the wireless APs 102 and 103 will transmit beacons simultaneously (or nearly simultaneously), such that the Wi-Fi device 101 cannot reliably or consistently receive beacons from both the wireless APs 102 and 103.

Figure 2:
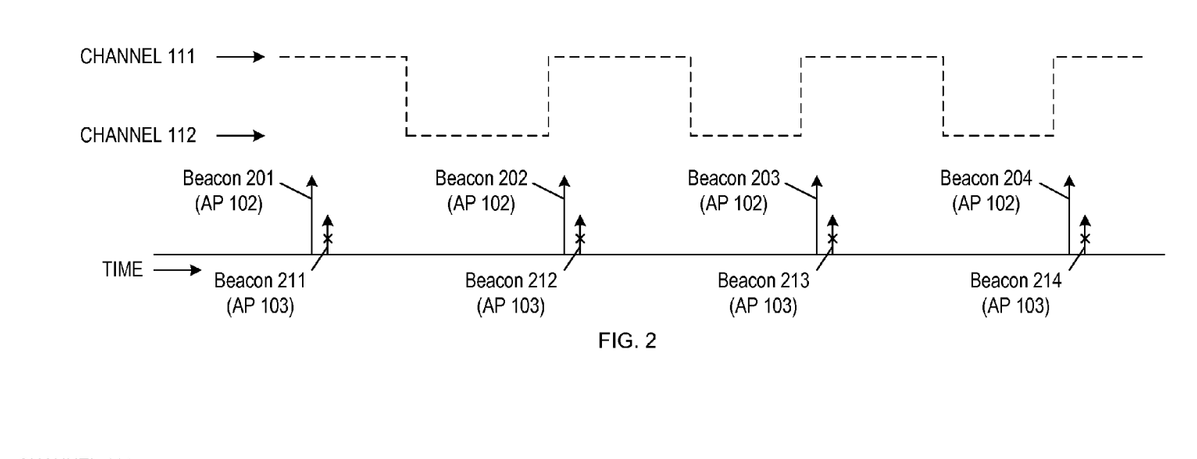
FIG. 2 is a timing diagram that illustrates the timing of beacons transmitted by the wireless APs of FIG. 1, wherein these wireless APs implement the same beacon interval.

FIG. 2 is a timing diagram that illustrates the timing of beacons 201-204 that may be transmitted by wireless AP 102, and beacons 211-214 that may be transmitted by wireless AP 103, wherein wireless APs 102 and 103 implement the same beacon interval. In the illustrated timing diagram, the wireless AP 102 transmits beacons 201-204 immediately before the wireless AP 103 transmits beacons 211-214, respectively. FIG. 2 also illustrates the timing with which the Wi-Fi device 101 services channels 111 and 112. Because beacons 201-204 occur before beacons 211-214, the Wi-Fi device 101 will service channel 111 in order to allow the station STA1 to receive the beacons 201-204 from the wireless AP 102. However, due to the proximity of the beacons 211-214 to the beacons 201-204, the Wi-Fi device 101 is not able to switch from the first channel 111 to the second channel 112 fast enough to receive the beacons 211-214 transmitted from the wireless AP 103. As a result, the station STA2 associated with the second channel 112 will never receive the beacons 211-214 transmitted by the wireless AP 103. This condition is illustrated by an 'X' through each of the beacons 211-214 in FIG. 2. Note that a simple algorithm which allows the earlier beacon to be received will not improve the above-described condition.

Figure 3:
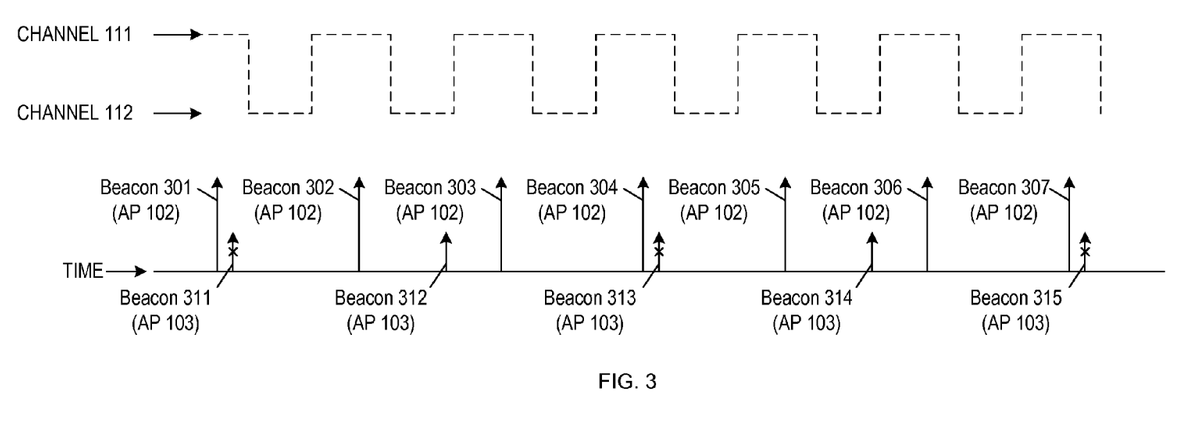
FIG. 3 is a timing diagram that illustrates the timing of beacons transmitted by the wireless APs of FIG. 1, wherein these wireless APs implement different beacon intervals.

FIG. 3 is a timing diagram that illustrates the timing of beacons 301-307 that may be transmitted by wireless AP 102, and beacons 311-315 that may be transmitted by wireless AP 103, wherein wireless APs 102 and 103 implement different beacon intervals. In the illustrated timing diagram, the wireless AP 102 transmits beacons 301, 304 and 307 immediately before the wireless AP 103 transmits beacons 311, 313 and 315, respectively. As a result, the Wi-Fi device 101 is not able to switch from the first channel 111 to the second channel 112 fast enough to allow the station STA2 to receive the beacons 311, 313 and 315 transmitted from the wireless AP 103 on the second channel 112. This condition is illustrated by an 'X' through each of the beacons 311, 313 and 315 in FIG. 3. In this example, beacons associated with the device having the longer beacon interval (i.e., beacons associated with wireless AP 103) are missed on a regular basis.

It would therefore be desirable to have a method that allows a Wi-Fi device to be simultaneously connected to two different wireless APs, which are associated with two different BSS networks on two different channels, without missing beacons from either of the two wireless APs.

In addition, although the above-described 'Wi-Fi Power Save Mode' allows Wi-Fi device 101 to save power by remaining in the sleep mode between TBTTs of the wireless APs 102 and 103, the amount of time that the Wi-Fi device 101 must be in the active state to receive the beacons is still significant. For example, assume that each of the wireless APs 102 and 103 implements a beacon interval of 100 milliseconds (ms). Further assume that each beacon includes 150 bytes transmitted at a minimum rate of 1 Mbps, such that each beacon has a duration of about 1.4 ms. In this example, each beacon accounts for 1.4% of the total air time, and the beacons for the two wireless APs 102 and 103 combine to account for 2.8% of the total air time. Thus, the wireless device 101 must be in the active state 2.8% of the time to receive the beacons transmitted by wireless APs 102 and 103. It would be desirable to have a method that allows a Wi-Fi device to receive beacons from a wireless AP in a manner that reduces the time the Wi-Fi device must be in the active state to receive the beacons.

In general, embodiments of the present invention introduce the concept of a beacon-poll frame, which is transmitted from a station (STA) (or a Wi-Fi direct client) to a wireless AP (or a Wi-Fi direct group owner (GO)), in an opportunistic manner. In response to receiving the beacon-poll frame, the wireless AP (or Wi-Fi direct GO) may transmit a unicast beacon frame to the STA (or Wi-Fi direct client) that sent the beacon-poll frame. The wireless AP (or Wi-Fi direct GO) may transmit the unicast beacon frame using a modulation and coding scheme (MCS) that allows the unicast beacon frame to be transmitted at a higher speed than a conventional broadcast beacon frame. As a result, the percentage of time that the STA (or Wi-Fi direct client) must be in the active state to receive the unicast beacon frame is less than the percentage of time that the STA (or Wi-Fi direct client) must be in the active state to receive a conventional broadcast beacon frame, thereby resulting in power savings within the STA (or Wi-Fi direct client). In a particular embodiment, the wireless AP (or Wi-Fi direct GO) aggregates any downlink (DL) data packets to be transmitted to the STA (or Wi-Fi direct client) with the unicast beacon frame, resulting in further power savings within the STA (or Wi-Fi direct client).

The STA (or Wi-Fi direct client) is able to remain associated with the wireless AP (or Wi-Fi direct GO) by receiving the unicast beacon frames. Because the STA (or Wi-Fi direct client) receives the required beacon information from the unicast beacon frames, the STA (or Wi-Fi direct client) is not required to listen for the beacon frames broadcast by the wireless AP (or Wi-Fi direct GO) at the scheduled TBTTs. As a result, beacon collision conditions, as illustrated by FIGS. 2 and 3, will not prevent the STA (or Wi-Fi direct client) from receiving the necessary beacon information.

Figure 4:
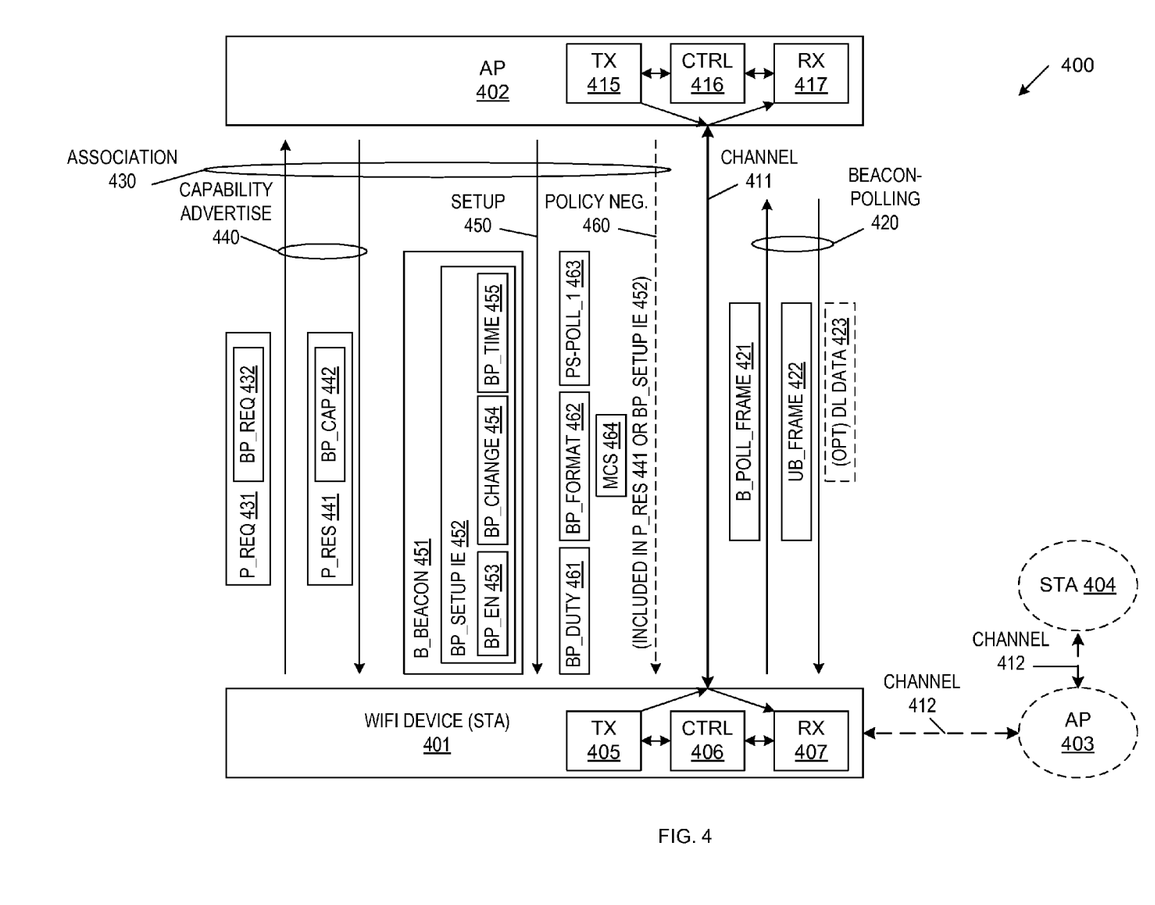
FIG. 4 is a block diagram of a wireless system that implements a beacon-polling process in accordance with one embodiment of the present invention.

The present invention will now be described in more detail. FIG. 4 is a block diagram of a wireless system 400 that includes Wi-Fi device (STA) 401 and wireless AP 402, which implement a beacon-polling process in accordance with the present invention. Wi-Fi device 401 operates as a station (STA) connected to wireless AP 402 in a first channel 411. Wi-Fi device 401 and wireless AP 402 initially engage in an association process 430, wherein these devices negotiate how communications will be performed in the BSS network. After the association process 430 is complete, Wi-Fi device 401 and wireless AP 402 engage in a beacon-polling process 420, wherein Wi-Fi device 401 transmits beacon-poll frames (e.g., B_POLL_FRAME 420) in an opportunistic manner to wireless AP 402, and wireless AP 402 responds by transmitting unicast beacon frames (e.g., UB_FRAME 421) to Wi-Fi device 401.

In general, Wi-Fi device 401 includes a transmitter circuit 405, a controller 406 and a receiver circuit 407, which implement various transmission, control and receive functions of device 401, which are described in more detail below. Similarly, wireless AP 402 includes a transmitter circuit 415, a controller 416 and a receiver circuit 417, which implement the various transmission, control and receive functions of the wireless AP 402, which are described in more detail below. Although controllers 406 and 416 are illustrated as circuit blocks in FIG. 4, it is understood that the functionality of these controller 406 and 416 can be provided by software, or a combination of hardware and software, in various embodiments.

In accordance with one embodiment of the present invention, the association process 430 includes a beacon polling handshake process that includes capability advertisement 440, setup 450, and policy negotiation 460.

In one embodiment, capability advertisement 440 is implemented using vendor specific information elements (IEs) included in probe request and probe response frames transmitted by Wi-Fi device 401 and wireless AP 402, respectively, whereby these devices 401-402 advertise their ability to participate in the beacon polling process. For example, Wi-Fi device 401 may initially transmit a probe request (P_REQ) 431 to wireless AP 402, wherein the probe request P_REQ 431 includes an indication of whether the Wi-Fi device 401 is capable of participating in the beacon-polling process of the present invention. For example, the probe request P_REQ 431 may include a beacon polling request field (BP_REQ) 432 that is given a first value to indicate that the Wi-Fi device 401 is capable of participating in the beacon-polling process, or a second value to indicate that the Wi-Fi device 401 is not capable of participating in the beacon-polling process. In present example, the beacon polling request field BP_REQ 432 is a vendor specific IE included in the probe request P_REQ 431.

Wireless AP 402 responds to the probe request P_REQ 431 by transmitting a probe response P_RES 441 to the Wi-Fi device 401, wherein the probe response P_RES 441 includes an indication of whether the wireless AP 403 is capable of participating in the beacon-polling process. For example, the probe response P_RES 441 may include a beacon polling capability field (BP_CAP) 442 that is given a first value to indicate that the wireless AP 402 is capable of participating in the beacon-polling process, or a second value to indicate that the wireless AP 402 is not capable of participating in the beacon-polling process. In the present example, the beacon polling response field BP_RES 442 is a vendor specific IE included in the probe response P_RES 441.

During the setup phase 450 of the beacon-polling handshake process, a wireless AP that is capable of participating in the beacon-polling process 420 indicates whether or not it will respond to beacon-polling frames received from a Wi-Fi device, and also indicates whether it will stop or start responding to beacon-polling frames at some time in the future.

For example, assuming that the wireless AP 402 is capable of participating in the beacon-polling process, this wireless AP 402 may append a vendor specific IE (BP_SETUP 452) to the beacon frames 451 broadcast at every TBTT, wherein BP_SETUP 452 includes a first field (BP_EN) 453 that indicates whether or not the wireless AP 402 will respond to received beacon-polling frames. Thus, the BP_EN field 453 is given a first value to indicate that the wireless AP 402 will respond to received beacon-polling frames, and a second value to indicate that the wireless AP 402 will not respond to received beacon-polling frames. The BP_SETUP IE 452 may also include a second field (BP_CHANGE) 454 that indicates whether or not the wireless AP 402 will change its ability to respond to beacon polling frames at a time in the future, and a third field (BP_TIME) 455 that indicates the time at which the ability to respond to beacon polling frames will change. For example, if the BP_CHANGE field 454 is given a first value to indicate that the manner in which the wireless AP 402 responds to received beacon-polling frames will remain unchanged, and a second value to indicate that the manner in which the wireless AP 402 responds to received beacon-polling frames will change.

Thus, if the wireless AP 402 is currently responding to received beacon-polling frames, and the BP_CHANGE field 454 has the first value, this indicates that the wireless AP 402 will continue to respond to received beacon-polling frames. However, if the wireless AP 402 is currently responding to received beacon-polling frames, and the BP_CHANGE field 454 has the second value, this indicates that the wireless AP 402 will stop responding to received beacon-polling frames (at a time indicated by the BP_TIME field 455). In one embodiment, the value stored in the BP_TIME field 455 indicates a number of beacon intervals until the change occurs. For example, a BP_TIME field 455 having a value of '5' indicates that the change will occur after five beacon intervals have elapsed.

Although the setup information has been described as being included in the beacon frame 451 broadcast by the wireless AP 402, it is understood that the setup information can also be transmitted in other manners. For example, the above-described setup information can be included in the probe response P_RES 441 transmitted by the wireless AP 402. The above-described setup information can also be included in the unicast beacon frames 422 transmitted by the wireless AP 402 after the association process is completed.

Note that if the wireless AP 402 is not participating in the beacon-polling process 420 with Wi-Fi device 401, then Wi-Fi device 401 may periodically wake up at specified TBTTs to receive beacon frames broadcast by the wireless AP 402. Wireless AP 402 may periodically broadcast conventional beacon frames at specified TBTTs, even if wireless AP 402 participates in the beacon-polling process with Wi-Fi device 401. These periodically broadcast beacons may enable other Wi-Fi devices, which do not participate in the beacon-polling process of the present invention, to become associated with the wireless AP 402 on the first channel 411 (and participate in the same BSS network as Wi-Fi device 401 and wireless AP 402).

During the policy negotiation phase 460 of the beacon-polling handshake process, a wireless AP that is participating in the beacon-polling process 420 (e.g., responding to received beacon-poll frames) may indicate: (1) how many beacon-poll frames the wireless AP will respond to during a certain number of beacon polling intervals, (2) the nature of the unicast beacon frame transmitted by the wireless AP, and (3) whether the wireless AP will treat a first PS-Poll (or a first trigger frame) received from the associated Wi-Fi device during a beacon interval as a beacon-poll frame, and respond with a unicast beacon frame.

For example, assuming that the wireless AP 402 is participating in the beacon-polling process, this wireless AP 402 may include a BP_DUTY field 461 in either the probe response P_RES 441 or the BP_SETUP IE 452, wherein the BP_DUTY field 461 stores a value that indicates how many beacon polling requests the wireless AP 402 will respond to during a certain number of beacon intervals. For example, the BP_DUTY field 461 may be given a first value to indicate that the wireless AP 402 will respond to no more than one beacon-poll frame during a beacon interval (to mimic the frequency at which the Wi-Fi device 401 would normally receive conventional broadcast beacon frames), a second value to indicate that the wireless AP 402 will respond to no more than one beacon-poll frame transmitted from Wi-Fi device 402 during two consecutive beacon intervals, and a third value to indicate that the wireless AP 402 will respond to no more than one beacon-poll frame every three consecutive beacon intervals. Other numbers of responses/beacon intervals can be specified in other embodiments. The wireless AP 402 does not need to respond to every beacon-poll frame transmitted by the Wi-Fi device 401, provided that the wireless AP 402 keeps track of when the last unicast beacon frame was transmitted to the Wi-Fi device 401. By responding to no more than one beacon-poll frame during multiple consecutive beacon intervals, the wireless AP 402 and Wi-Fi device 401 may remain associated, while reducing power consumption in both the wireless AP 402 and Wi-Fi device 401.

The wireless AP 402 can also include a BP_FORMAT field 462 in the probe response P_RES 441 or the BP_SETUP IE 452, wherein the BP_FORMAT field 462 stores a value that indicates whether the unicast beacon frame 422 transmitted from the wireless AP 402 in response to a beacon-poll frame 421 received from the Wi-Fi device 401 is a regular beacon frame, or a variation of a regular beacon frame. For example, the BP_FORMAT field 462 may be given a first value to indicate that the unicast beacon frame 422 transmitted by the wireless AP 402 includes the same information as conventional broadcast beacon frames. Alternately, the BP_FORMAT field 462 may be given: (a) a second value to indicate that the unicast beacon frame 422 transmitted by the wireless AP 402 is a reduced beacon frame, which includes fewer fields and/or IEs than a conventional beacon frame; (b) a third value to indicate that the unicast beacon frame 422 transmitted by the wireless AP 402 is an incremental beacon frame, which includes only fields and/or IEs that are different than those transmitted in a previously sent beacon frame; (c) a fourth value to indicate that the unicast beacon frame 422 transmitted by the wireless AP 402 is a compressed beacon frame, which applies a compression method to the fields and IEs of a beacon frame, thereby reducing the overall size of the beacon frame; or (d) a fifth value to indicate that the unicast beacon frame 422 transmitted by the wireless AP 402 is a combination beacon frame, which includes a predetermined combination of the above-described reduced, incremental and compressed beacon frames.

The wireless AP 402 can also include a PS-POLL_1 field 463 in the probe response P_RES 441 or the BP_SETUP IE 452, wherein the PS-POLL_1 field 463 stores a value that indicates whether or not the wireless AP 402 will treat a first PS-Poll (or a first trigger frame) received from the associated Wi-Fi device 401 during a beacon interval as a beacon-poll frame, and respond with a unicast beacon frame. For example, the PS-POLL_1 field 463 may be given a first value to indicate that the wireless AP 402 will treat a first PS-Poll (or a first trigger frame) received from the associated Wi-Fi device 401 during a beacon interval as a beacon-poll frame. If the PS-POLL_1 field 463 has a second value, the wireless AP 402 will respond to each PS-Poll (and each trigger frame) received from the Wi-Fi device 401 in a conventional manner.

The wireless AP 402 can also include an MCS field 464 in the probe response P_RES 441 or the BP_SETUP IE 452, wherein the MCS field 464 stores a value that identifies a modulation and coding scheme to be used by the wireless AP 402 to transmit unicast beacon frames 422. The MCS field 464 is described in more detail below.

After the beacon-polling process of the present invention has been enabled between the Wi-Fi device 401 and the wireless AP 402 by the association process 430 described above, Wi-Fi device 401 does not wake up at the TBTTs specified by the wireless AP 402 to listen for beacon frames broadcast by the wireless AP 402. That is, the Wi-Fi device 401 does not need to wake up at a predetermined time. Instead, the Wi-Fi device 401 wakes up at an opportunistic time and transmits a beacon-poll frame (B_POLL_FRAME) 421 to wireless AP 402. As defined herein, an 'opportunistic time' is a time during which the Wi-Fi device 401 is free to communicate with the wireless AP 402 on the first channel 411.

For example, Wi-Fi device 401 may be concurrently participating in multiple BSS networks, such as a second BSS network by communication with a second wireless AP 403 on a second channel 412, as illustrated by FIG. 4. In this example, the Wi-Fi device 401 is only able to communicate with one of the wireless APs 402-403 at a time. That is, if the Wi-Fi device 401 is in an active state in one of the BSS networks, the Wi-Fi device 401 must be a sleep mode in the other one of the BSS networks. When the Wi-Fi device 401 is currently in a sleep mode on the second channel 412, this presents an opportunistic time during which the Wi-Fi device 401 may transmit a beacon-poll frame to the wireless AP 402 on the first channel 411. In accordance with one embodiment, the second wireless AP 403 may cause the Wi-Fi device 401 to enter a sleep mode on the second channel 412 upon initiating communications with another Wi-Fi device (STA) 404 on the second channel 412.

The beacon-poll frame B_POLL_FRAME 421 transmitted by the Wi-Fi device 401 to the wireless AP 402 on the first channel 411 indicates that the Wi-Fi device 401 is ready and able to receive the associated beacon information from the wireless AP 402. Various methods can be used to realize the beacon-poll frame B_POLL_FRAME 421 in accordance with the invention. Although several methods of realizing the beacon-poll frame B_POLL_FRAME 421 are described below, it is understood that the beacon-poll frame 421 of the present invention is not limited to these methods, and that other methods would be apparent to one of ordinary skill in the art.

First, the beacon-poll frame B_POLL_FRAME can be realized using an existing frame type, such as the power save (PS) Poll or a trigger frame of U-APSD (unscheduled-automatic power save delivery).

Figure 5:
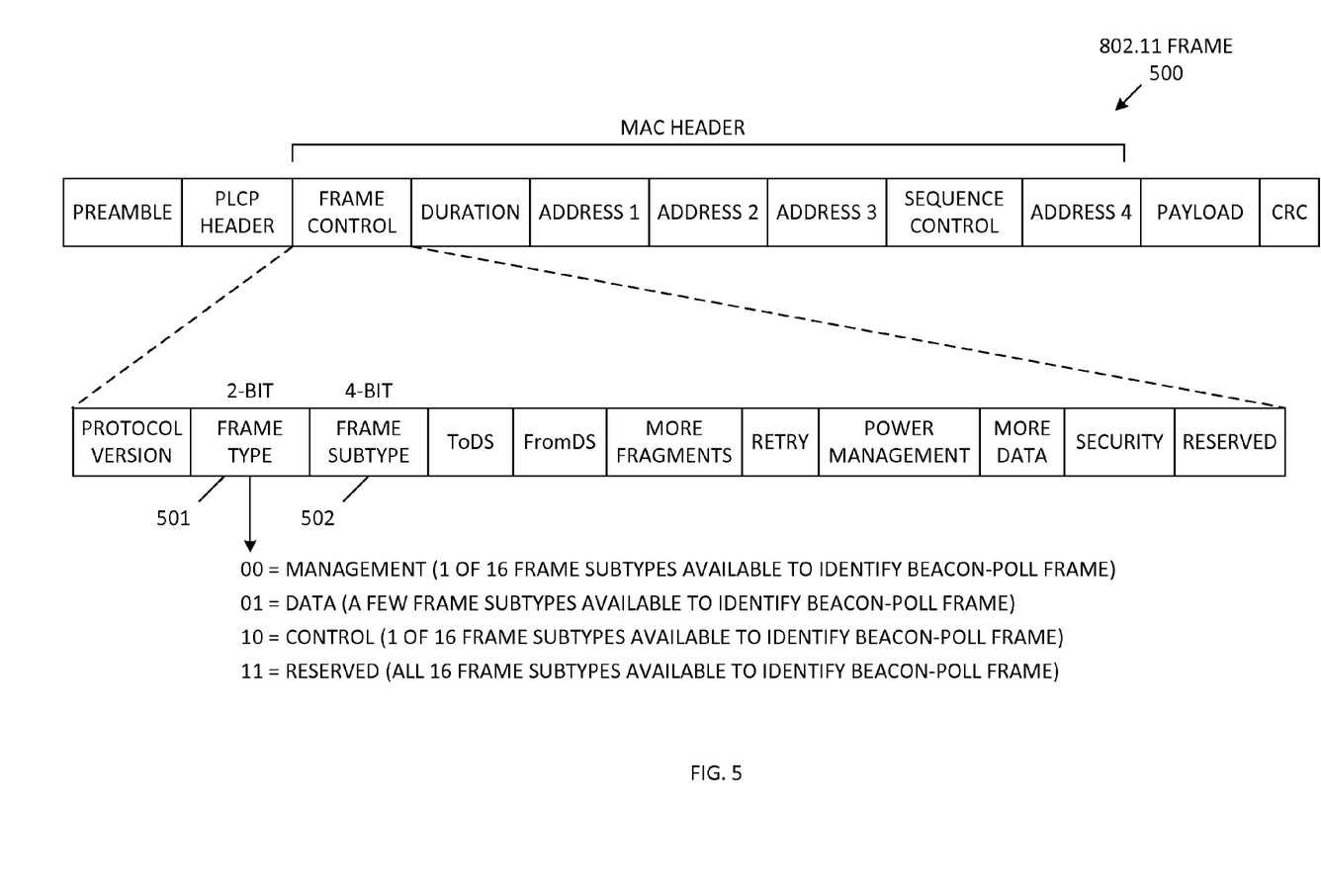
FIG. 5 is a block diagram of a frame that is modified to realize a beacon-poll frame in accordance with one embodiment of the present invention.

Second, the beacon-poll frame B_POLL_FRAME can be realized by defining a new frame type within the IEEE 802.11 standard framework. FIG. 5 is a block diagram of a 802.11 frame 500, which can be modified to realize a beacon-poll frame 421 in accordance with various embodiments of the present invention. A Wi-Fi frame type is currently defined by a 2-bit frame type field 501 and a 4-bit frame subtype field 502. The 2-bit frame type field 501 currently defines three types of frames, including management frames (frame type='00'), data frames (frame type='01') and control frames (frame type='10'). The 2-bit frame type field 501 also defines a 'reserved' frame type (frame type='11'), which can be used to define the beacon-poll frame 421 of the present invention. Note that the 4-bit frame subtype field 502 associated with the 'reserved' frame type is able to define 16 subtypes, all of which are reserved and could be used to define the beacon-poll frame 421 of the present invention.

Alternately, the management frame type (frame type='00') includes 16 frame subtypes (defined by the 0-bit frame subtype field 502), wherein one of these 16 frame subtypes is currently reserved, and could be used to define the beacon-poll frame 421 in accordance with one embodiment of the present invention.

Similarly, the data frame type (frame type='01') includes 16 frame subtypes (defined by the 4-bit frame subtype field 502), wherein a few of these 16 frame subtypes are currently reserved, and could be used to define the beacon-poll frame 421 in accordance with another embodiment of the present invention.

Finally, the control frame type (frame type='10') includes 16 frame subtypes (defined by the 4-bit frame subtype field 502), wherein one of these 16 frame subtypes is currently reserved, and could be used to define the beacon-poll frame 421 in accordance with another embodiment of the present invention.

In another embodiment, a vendor specific information element (IE), such as the vendor specific public action frame, which is included in management frames transmitted by the Wi-Fi device 401, can be used to identify a beacon-poll frame 421 of the present invention. In yet another embodiment, data frames transmitted by the Wi-Fi device 401 can be used to identify a beacon-poll frame 421 of the present invention. For instance, during the association process, the Wi-Fi device 401 and the wireless AP 402 may negotiate a specific transaction identification value (TID), which when included in a data frame, indicates a beacon-poll frame 421. Alternately, during the association process, the Wi-Fi device 401 and the wireless AP 402 may agree to use certain reserved bits in the MAC header fields (e.g., reserved bits in the QoS Control field) of data frames to indicate a beacon-poll frame 421.

In response to receiving a beacon-poll frame B_POLL_FRAME 421 from Wi-Fi device 401, wireless AP 402 determines whether to transmit a unicast beacon frame (UB_FRAME) 422 to the Wi-Fi device 401. The wireless AP 402 will transmit a unicast beacon frame (UB_FRAME 422) to the Wi-Fi device 401 in response to a beacon-poll frame 421 received from the Wi-Fi device 401 as long as: (a) the wireless AP 402 is currently enabled to participate in the beacon-polling process with the Wi-Fi device 401 (as specified by the BP_EN field 452, the BP_CHANGE field 454 and the BP_TIME field 455 of the BP_SETUP IE 452 described above); and, (b) responding to the beacon-poll frame 241 would not cause the wireless AP 402 to respond to an excessive number of beacon-poll frames in a predetermined time period as specified by the BP_DUTY field 461 described above.

Note that any unicast beacon frame 422 transmitted from the wireless AP 402 to the Wi-Fi device 401 may include beacon information provided in the format specified by the BP_FORMAT field 462 described above in connection with the policy negotiation phase 460.

Note that the beacon-polling process 420 of the present invention introduces additional overhead on the first channel 411. Multiple Wi-Fi devices can be associated with the wireless AP 402 on the first channel 411, wherein each of these multiple Wi-Fi devices may engage in the beacon-polling process 420 of the present invention. If the wireless AP 402 transmits multiple unicast beacon frames 422 to multiple Wi-Fi devices, the percentage of total air time used to transmit beacon information on channel 411 may become significant. Accordingly, embodiments of the present invention provides various methods for minimizing the overhead introduced by the beacon polling process. Because the wireless AP 402 is polled by a known Wi-Fi device 401, and the resulting beacon frame 422 is transmitted in a unicast manner, the wireless AP 402 can choose an appropriate modulation and coding scheme (MCS) for transmitting the unicast beacon frame 422, wherein the MCS is selected to provide a much higher data transmission (PHY) rate than the minimum rate of 1 Mbps. For instance, if the unicast beacon frame 422 is sent at MCS=7 in the 40 MHz format defined by the IEEE 802.11n standard, the data rate is 150 Mbps, and the duration of the unicast beacon frame 422 is 44 microseconds ($\mu$s), which is significantly less than the duration of a conventional broadcast beacon frame (1.4 ms). In accordance with one embodiment, the MCS used by the wireless AP 402 to transmit unicast beacon frames to Wi-Fi device 401 is specified by the MCS field 464 during the above-described association process 430.

In another embodiment, overhead further can be reduced by allowing the wireless AP 402 to aggregate the unicast beacon frame 422 into an A-MPDU (aggregated-MAC protocol data unit) frame that also contains the down link (DL) data packets (illustrated as optional DL data 423 in FIG. 4) to be transmitted from the wireless AP 402 to the Wi-Fi device 401.

Note that overhead can further be reduced by transmitting the unicast beacon frames 422 as reduced beacon frames, incremental beacon frames or compressed beacon frames, as specified by the BP_FORMAT field 462 described above.

Figure 6:
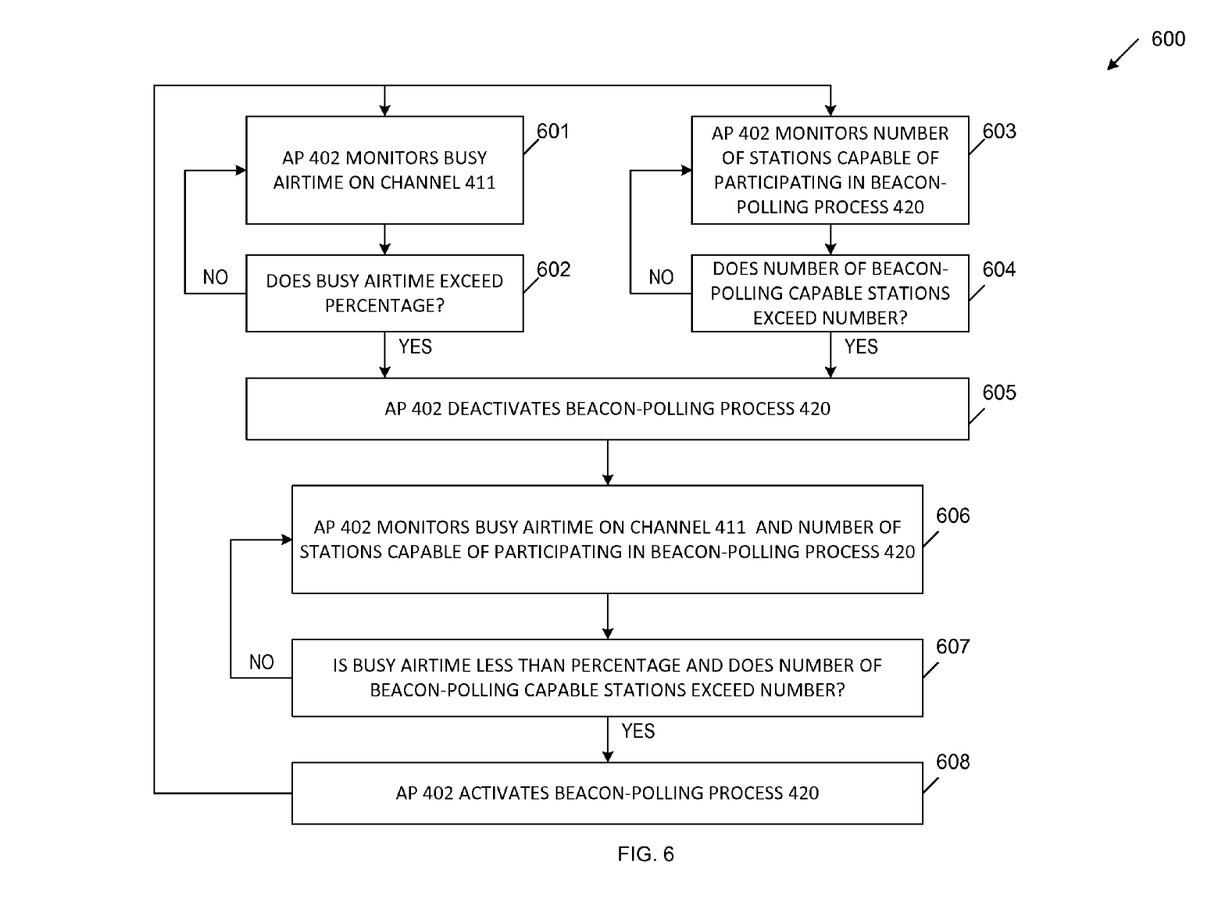
FIG. 6 is a flow diagram illustrating a method for activating/deactivating a beacon-polling process in accordance with one embodiment of the present invention.

In accordance with another embodiment of the present invention, the wireless AP 402 determines whether to activate or deactivate the beacon-polling process in response to a detected amount of network traffic or a detected number of stations capable of participating in the beacon-polling process. FIG. 6 is a flow diagram 600 illustrating a method for activating/deactivating the beacon-polling process in accordance with one embodiment of the present invention.

In this embodiment, wireless AP 402 monitors the busy airtime on channel 411 (e.g., the time during which communications are taking place on channel 411) (Step 601). If the wireless AP 402 detects that the busy airtime exceeds a predetermined percentage (e.g., 50%) of the total airtime (Step 602, Yes branch), then wireless AP 402 deactivates the beacon-polling process 420 (Step 605). Similarly, the wireless AP 402 keeps track of the number of associated stations that are capable of participating in the beacon-polling process 420 on channel 411 (Step 603). If the wireless AP 402 detects that the number of associated stations capable of participating in the beacon-polling process on channel 411 exceeds a predetermined number (Step 604, Yes branch), then wireless AP 402 deactivates the beacon-polling process 420 (Step 605).

If the wireless AP 402 detects that the busy airtime does not exceed the predetermined percentage of the total airtime (Step 602, No branch), processing returns to Step 601. Similarly, if the wireless AP 402 detects that the number of associated stations capable of participating in the beacon-polling process on channel 411 does not exceed the predetermined number (Step 604, No branch), then processing returns to Step 603.

In one embodiment, the wireless AP 402 deactivates the beacon-polling process 420 by transmitting a unicast beacon frame 422 to each of the associated stations (e.g., Wi-Fi device 401) currently participating in the beacon polling process 420, wherein these unicast beacon frames 422 each include an information element having fields similar to the BP_CHANGE field 454 and BP_TIME field 455 described above. That is, these unicast beacon frames include fields that indicate the ability of the wireless AP 402 to participate in the beacon-polling process will change (from participating to non-participating) at the end of a specified number of beacon intervals. By allowing the wireless AP 402 to indicate that the beacon polling process 420 will be deactivated after a plurality of beacon intervals (e.g., 5 beacon intervals), all associated stations participating in the beacon-polling process 420 can be informed of the pending deactivation before the actual deactivation occurs.

In response to receiving a unicast beacon frame indicating that the beacon-polling process is being deactivated by the wireless AP 402, the Wi-Fi device 401 stops transmitting beacon-poll frames, and instead, periodically listens for beacon frames broadcast by the wireless AP 402 at the scheduled TBTTs.

After the beacon-polling process 420 is deactivated, the wireless AP 402 monitors the busy airtime on channel 411 and keeps track of the number of stations capable of participating in the beacon polling process 420 (Step 606.) If the detected percentage of busy airtime decreases below the threshold percentage and the detected number of stations capable of participating in the beacon-polling process decreases below the threshold number (Step 607, Yes branch), then the wireless AP 402 re-activates the beacon-polling process 420 (Step 608), and processing then returns to Steps 601 and 603. In one embodiment, the wireless AP 402 reactivates the beacon-polling process 420 by modifying the beacon frames broadcast at the TBTTs. That is, these broadcast beacon frames are modified such that the BP_CHANGE field 454 and BP_TIME field 455 (described above) indicate the ability of the wireless AP 402 to participate in the beacon-polling process 420 will change (from non-participating to participating) at the end of a specified number of beacon intervals. At the end of the specified number of beacon intervals, the associated stations capable of participating in the beacon-polling process may begin transmitting beacon-poll frames in an opportunistic manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method comprising:
    receiving, by a wireless station (STA), a first information element and a second information element from a wireless first access point (AP), wherein the first information element indicates whether the first AP currently responds to beacon poll frames and the second information element indicates that the first AP is activating or deactivating a beacon-polling process;
    identifying a transmission opportunity by the STA;
    transmitting a beacon poll frame from the STA to the first AP during the identified transmission opportunity;
    receiving, by the STA, a unicast beacon frame from the first AP, wherein the unicast beacon frame replaces a periodic broadcast beacon frame for the STA and is transmitted at a higher rate than the replaced periodic broadcast beacon frame; and
    receiving, by the STA, at least one periodic broadcast beacon frame from a wireless second AP.

2. The method of claim 1, wherein the first AP transmits only one unicast beacon frame to the STA during a beacon interval of the first AP.

3. The method of claim 1, further comprising preventing the first AP from sending unicast beacon frames if the first AP becomes associated with more than a predetermined number of STAs.

4. The method of claim 1, wherein the unicast beacon frame comprises downlink data.

5. The method of claim 1, further comprising:
    transmitting a probe request from the STA to the first AP, wherein the probe request indicates that the STA is capable of participating in beacon polling; and
    receiving a probe response with the STA, wherein the probe response is transmitted by the first AP, and indicates the first AP is capable of participating in beacon polling.

6. The method of claim 1, wherein at least one of the information elements indicates a maximum number of beacon poll frames the first AP will respond to over a predetermined number of beacon intervals.

7. The method of claim 1, wherein at least one of the information elements indicates whether the first AP will respond to the beacon poll frame with a periodic broadcast beacon frame or a unicast beacon frame.

8. The method of claim 7, wherein the unicast beacon frame comprises a reduced beacon frame having fewer fields and/or information elements than a periodic broadcast beacon frame.

9. The method of claim 7, wherein the unicast beacon frame comprises an incremental beacon frame having different fields and information elements than a periodic broadcast beacon frame.

10. The method of claim 7, wherein the unicast beacon frame comprises a compressed beacon frame, which compresses one or more of the fields and information units of a periodic broadcast beacon frame.

11. The method of claim 1, further comprising receiving an information element with the STA, wherein the information element is transmitted by the first AP and indicates that the first AP will treat a first Power Save (PS)-Poll and/or a first trigger frame received from the STA during a beacon interval as a beacon poll frame.

12. A method comprising:
    transmitting, by a wireless first access point (AP), a first information element and a second information element, wherein the first information element indicates whether the first AP currently responds to beacon poll frames and the second information element indicates that the first AP is activating or deactivating a beacon-polling process;
    receiving by the first AP a beacon poll frame from a wireless station (STA) during an identified transmission opportunity for the STA; and
    in response to receiving the beacon poll frame, transmitting a unicast beacon frame from the first AP to the STA, wherein the unicast beacon frame replaces a periodic broadcast beacon frame for the STA and is transmitted at a higher rate than the replaced periodic broadcast beacon frame, the STA is configured to receive both higher rate unicast beacon frames from the first AP and periodic broadcast beacon frames from a wireless second AP.

13. The method of claim 12, wherein the first AP transmits only one unicast beacon frame to the STA during a beacon interval of the first AP.

14. The method of claim 12, further comprising:
    monitoring a number of stations capable of transmitting beacon poll frames to the first AP; and
    preventing the first AP from sending unicast beacon frames if the number of stations capable of transmitting beacon poll frames to the first AP exceeds a predetermined number.

15. The method of claim 12, further comprising including downlink data for the STA in the unicast beacon frame.

16. The method of claim 12, further comprising limiting a number of unicast beacon frames the first AP can transmit to the STA over a first time period.

17. A wireless station (STA) comprising:
a receiver to receive a first information element and a second information element from a wireless first access point (AP), wherein the first information element indicates whether the first AP currently responds to beacon poll frames and the second information element indicates that the first AP is activating or deactivating a beacon-polling process;
a controller to identify a transmission opportunity on a wireless medium;
a transmitter to transmit a beacon poll frame from the STA to the first AP during the identified transmission opportunity; and
wherein the receiver is further to receive a unicast beacon frame from the first AP, wherein the unicast beacon frame replaces a periodic broadcast beacon frame for the STA and is transmitted at a higher rate than the replaced periodic broadcast beacon frame, and to receive a periodic broadcast beacon frame from a wireless second AP.

18. The STA of claim 17, wherein the receiver is further to receive a beacon polling duty (BP_DUTY) value transmitted by the first AP, wherein the BP_DUTY value indicates how many beacon poll frames the first AP will respond to during a certain number of beacon intervals.

19. The STA of claim 17, wherein the transmitter is further to transmit a probe request to the first AP, wherein the probe request indicates that the STA is capable of participating in beacon polling.

20. The STA of claim 19, wherein the receiver is further to receive a probe response transmitted by the first AP, the probe response indicating that the first AP is capable of participating in beacon polling.

21. The STA of claim 17, wherein at least one of the information elements indicates whether the first AP will respond to the beacon poll frame with a first type of unicast beacon frame or a second type of unicast beacon frame.

22. A wireless first access point (AP) comprising:
a transmitter to transmit a first information element and a second information element, wherein the first information element indicates whether the first AP currently responds to beacon poll frames and the second information element indicates that the first AP is activating or deactivating a beacon-polling process;
a receiver to receive a beacon poll frame from a wireless station (STA) during an identified transmission opportunity of the STA; and
wherein the transmitter is further to transmit a unicast beacon frame to the STA in response to the beacon poll frame, wherein the unicast beacon frame replaces a periodic broadcast beacon frame for the STA and is transmitted at a higher rate than the replaced periodic broadcast beacon frame, the STA is configured to receive both higher rate unicast beacon frames from the first AP and periodic broadcast beacon frames from a wireless second AP.

23. The first AP of claim 22, further comprising a controller to limit a number of unicast beacon frames transmitted to the STA during a predetermined number of beacon intervals of the first AP.

24. The first AP of claim 23, wherein the controller is further to monitor a number of stations (STAs) capable of transmitting beacon poll frames to the first AP and stop the first AP from transmitting unicast beacon frames if the number of STAs capable of transmitting beacon poll frames to the first AP exceeds a predetermined number.

25. The first AP of claim 23, wherein the controller is further to monitor traffic on a channel used to communicate with the STA, wherein the channel has a bandwidth, and stop the first AP from transmitting unicast beacon frames if the traffic on the channel exceeds a predetermined percentage of the bandwidth.

26. The first AP of claim 22, further comprising a controller to include downlink data for the STA with the unicast beacon frame.

27. The first AP of claim 22, wherein the transmitter is further to transmit a beacon polling duty (BP_DUTY) value, that indicates to the STA how many beacon poll frames the first AP will respond to during a certain number of beacon intervals.

28. The first AP of claim 22, wherein the receiver is further to receive a probe request from the STA, wherein the probe request indicates that the STA is capable of participating in beacon polling, and the transmitter is configured to transmit a probe response to the STA, the probe response indicating that the first AP is capable of participating in beacon polling.

29. The first AP of claim 22, wherein at least one of the information elements indicates whether the first AP will respond to the beacon poll frame with a first type of unicast beacon frame or a second type of unicast beacon frame.

30. A method of implementing a beacon-polling process between a wireless station (STA) and a wireless first access point (AP), comprising
providing a frame in accordance with the IEEE 802.11 standard with the STA, the frame including a frame subtype field having a bit set to identify the frame as a beacon-polling frame;
receiving, by the STA, a first information element and a second information element from the first AP, wherein the first information element indicates whether the first AP currently responds to beacon poll frames and the second information element indicates that the first AP is activating or deactivating a beacon-polling process;
transmitting the frame from the STA to the first AP;
receiving a unicast beacon frame by the STA, wherein the unicast beacon frame replaces a periodic broadcast beacon frame for the STA and is transmitted at a higher rate than the replaced periodic broadcast beacon frame; and
receiving at least one periodic broadcast beacon frame from a wireless second AP by the STA.

31. The method of claim 30, wherein the unicast beacon frame is transmitted by the first AP in response to receiving the frame and identifying the frame as a beacon-polling frame.

32. A method comprising:
identifying a transmission opportunity by a wireless station (STA);
transmitting a beacon poll frame from the STA to a wireless access point (AP) during the identified transmission opportunity;
receiving by the STA a unicast beacon frame in response to the beacon poll frame, wherein the unicast beacon frame is from the AP and replaces a periodic broadcast beacon frame for the STA, wherein the unicast beacon frame comprises one of a regular beacon frame and a modified beacon frame, and wherein the STA is configured to receive both higher rate unicast beacon frames and periodic broadcast beacon frames from the AP; and
receiving an information element by the STA, wherein the information element is from the AP and indicates whether the AP currently responds to beacon poll frames with the periodic broadcast beacon frame or the unicast beacon frame.

33. The method of claim 32, further comprising:
transmitting the beacon poll frame from the STA to the AP at a first rate; and
receiving the unicast beacon frame transmitted by the AP to the STA at a second rate that is faster than the first rate.

34. The method of claim 32, wherein the AP transmits only one unicast beacon frame to the STA during a beacon interval of the AP.

35. The method of claim 32, further comprising preventing the AP from sending unicast beacon frames if the AP becomes associated with more than a predetermined number of STAs.

36. The method of claim 32, further comprising:
transmitting a probe request from the STA to the AP, wherein the probe request indicates that the STA is capable of participating in beacon polling; and
receiving a probe response with the STA, wherein the probe response is transmitted by the AP, and indicates the AP is capable of participating in beacon polling.

37. The method of claim 32, further comprising receiving a second information element with the STA, wherein the second information element is transmitted by the AP and indicates that the ability of the AP to respond to a beacon poll frame is changing.

38. The method of claim 32, wherein the unicast beacon frame comprises a reduced beacon frame having fewer fields and/or information elements than a periodic broadcast beacon frame.

* * * * *